United States Patent
Kanai

(10) Patent No.: US 9,623,775 B2
(45) Date of Patent: Apr. 18, 2017

(54) VEHICLE SEAT

(75) Inventor: Yuya Kanai, Yokohama (JP)

(73) Assignee: Johnson Controls Technology Company, Holland, MI (US)

( * ) Notice: Subject to any disclaimer, the term of this patent is extended or adjusted under 35 U.S.C. 154(b) by 286 days.

(21) Appl. No.: 14/416,184

(22) PCT Filed: Jul. 23, 2012

(86) PCT No.: PCT/JP2012/068575
§ 371 (c)(1),
(2), (4) Date: May 22, 2015

(87) PCT Pub. No.: WO2014/016887
PCT Pub. Date: Jan. 30, 2014

(65) Prior Publication Data
US 2015/0251569 A1    Sep. 10, 2015

(51) Int. Cl.
*B60N 2/30* (2006.01)
*B60N 2/06* (2006.01)
*B60N 2/12* (2006.01)
*B60N 2/68* (2006.01)
*B60N 2/44* (2006.01)
*B60N 2/02* (2006.01)

(52) U.S. Cl.
CPC ............... *B60N 2/305* (2013.01); *B60N 2/06* (2013.01); *B60N 2/12* (2013.01); *B60N 2/3013* (2013.01); *B60N 2/3031* (2013.01); *B60N 2/682* (2013.01); *B60N 2002/0216* (2013.01); *B60N 2002/445* (2013.01)

(58) Field of Classification Search
CPC .... B60N 2/305; B60N 2/3013; B60N 2/3031; B60N 2/12; B60N 2/06; B60N 2/6862

USPC ......................................................... 297/325
See application file for complete search history.

(56) References Cited

U.S. PATENT DOCUMENTS 6,883,868 B2 * 4/2005 Yoshida ................. B60N 2/305
296/65.13
8,434,808 B2 * 5/2013 Abe ...................... B60N 2/3013
296/65.03

FOREIGN PATENT DOCUMENTS

| JP | WO 2008029947 A1 * | 3/2008 | ........... B60N 2/3013 |
| JP | 4437977 B2 | 3/2010 | |
| JP | 2011-218841 A | 11/2011 | |
| JP | 4941965 B2 | 5/2012 | |

OTHER PUBLICATIONS

International Search Report in PCT/JP2012/068575 dated Aug. 14, 2012, 3 pages.
Written Opinion of the International Searching Authority in PCT/JP2012/068575 dated Aug. 14, 2012, 3 pages.

* cited by examiner

*Primary Examiner* — Anthony D Barfield
(74) *Attorney, Agent, or Firm* — Foley & Lardner LLP

(57) ABSTRACT

A vehicle seat in which a forward tilting of a frame causes a turning of a walk-in member, the turning of the walk-in member causes a turning of a disengagement member, the turning of the disengagement member causes a turning of a tip-up locking member thereby disengaged from a stopper member, and then a cushion frame is tipped up by a rotational biasing force applied by a biasing unit.

1 Claim, 5 Drawing Sheets

// VEHICLE SEAT

CROSS REFERENCE TO RELATED APPLICATIONS

The present application is a U.S. National Stage of International Application No. PCT/JP2012/068575 filed on Jul. 23, 2012, the entire disclosure of which is incorporated herein by reference.

TECHNICAL FIELD

The present invention relates to a seat designed to be mounted on a vehicle such as an automobile.

BACKGROUND ART

Patent Literature 1 proposes a related vehicle seat including a mechanism which lifts up (or tips up) the front end side of the seat after the seat is moved forward via a walk-in mechanism.

CITATION LIST

Patent Literature

Patent Literature 1: Japanese Patent No. 4437977

SUMMARY OF INVENTION

In such a related technique, the tip-up mechanism is complicated, thereby increasing the manufacturing cost and also making the seat heavy. For this reason, improvement is needed.

An object of the present invention is to provide a vehicle seat which includes a simple tip-up mechanism and is therefore low in manufacturing cost and light in weight.

An aspect of the present invention is a vehicle seat including: a joining unit; a cushion frame joined to a seat cushion, turnably supported on the joining unit about a third pivot portion, and fixed to the third pivot portion; a frame joined to a seat back and turnably supported on the joining unit; a walk-in member turnably supported on the joining unit about a first pivot portion, and having an input portion and an output portion with the first pivot portion located between the input portion and the output portion; a disengagement member turnably supported on the joining unit about a second pivot portion, the disengagement member having one end portion joined to the output portion via a rod, another end portion arranged at a position being at a right angle to the one end portion, and a pressing portion formed on the one end portion; the rod joining the output portion of the walk-in member and the one end portion of the disengagement member; and a tip-up locking member turnably supported on the joining unit about the second pivot portion, the tip-up locking member having one end portion contacting the pressing portion, another end portion formed on the one end portion in a bifurcated shape, and an engagement portion extending from the one end portion and the other end portion toward a front side; a spring suspended between the other end portion of the tip-up locking member and the joining unit, and constantly rotationally biasing the tip-up locking member about the second pivot portion in a counterclockwise direction; a movement hole provided in the joining unit; a stopper member joined to the cushion frame and capable of engaging with and disengaging from the engagement portion of the tip-up locking member, the stopper member moving inside the movement hole in response to turn of the cushion frame about the third pivot portion; and a biasing unit applying a rotational biasing force to the third pivot portion in the counterclockwise direction, wherein a forward tilting of the frame causes a turning of the walk-in member, the turning of the walk-in member causes a turning of the disengagement member, the turning of the disengagement member causes a turning of the tip-up locking member thereby disengaged from the stopper member, and then the cushion frame is tipped up by the rotational biasing force applied by the biasing unit.

According to the above aspect, it is possible to provide a vehicle seat which includes a simple tip-up mechanism and is therefore low in manufacturing cost and light in weight.

DESCRIPTION OF EMBODIMENTS

Figure 1:
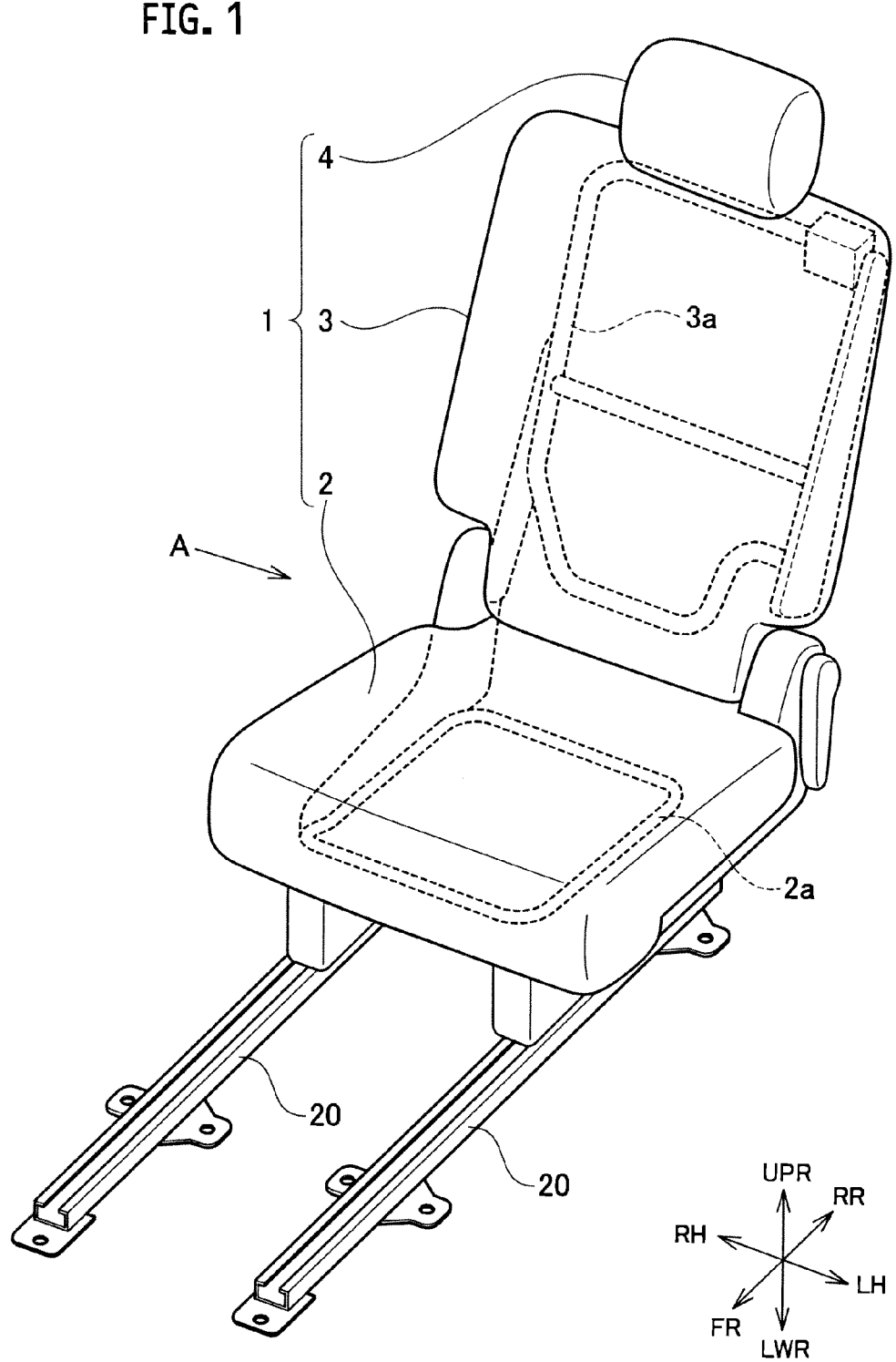
FIG. 1 is a perspective view of a vehicle seat according to one embodiment of the present invention.

The object of providing a vehicle seat which includes a simple tip-up mechanism and is therefore low in manufacturing cost and light in weight is achieved by the following configuration. Specifically, the configuration includes: a joining unit; a cushion frame joined to a seat cushion, turnably supported on the joining unit about a third pivot portion, and fixed to the third pivot portion; a frame joined to a seat back and turnably supported on the joining unit; a walk-in member turnably supported on the joining unit about a first pivot portion, and having an input portion and an output portion with the first pivot portion located between the input portion and the output portion; a disengagement member turnably supported on the joining unit about a second pivot portion, the disengagement member having one end portion joined to the output portion via a rod, another end portion arranged at a position being at a right angle to the one end portion, and a pressing portion formed on the one end portion; the rod joining the output portion of the walk-in member and the one end portion of the disengagement member; and a tip-up locking member turnably supported on the joining unit about the second pivot portion, the tip-up locking member having one end portion contacting the pressing portion, another end portion formed on the one end portion in a bifurcated shape, and an engagement portion extending from the one end portion and the other end portion toward a front side; a spring suspended between the other end portion of the tip-up locking member and the joining unit, and constantly rotationally biasing the tip-up locking member about the second pivot portion in a counterclockwise direction; a movement hole provided in the joining unit; a stopper member joined to the cushion frame and capable of engaging with and disengaging from the engagement portion of the tip-up locking member, the stopper member moving inside the movement hole in response to turn of the cushion frame about the third pivot portion; and a biasing unit applying a rotational biasing force to the third pivot portion in the counterclockwise direction. A forward tilting of the frame causes a turning of the walk-in member, the turning of the walk-in member causes a turning of the disengagement member, the turning of the disengagement member causes a turning of the tip-up locking member thereby disengaged from the stopper member, and then the cushion frame is tipped up by the rotational biasing force applied by the biasing unit.

Hereinbelow, a vehicle seat 1 according to one embodiment of the present invention will be described with reference to FIGS. 1 to 5. In FIGS. 1 to 4, FR, RR, LWR, UPR, RH, LH denote directions toward the front, rear, lower, upper, right, and left sides of a vehicle, respectively. The vehicle seat 1 includes: a seat cushion 2; a cushion frame 2a joined to the seat cushion 2; a seat back 3; a frame 3a joined to the seat back 3; a joining unit 18 joining the cushion frame 2a and the frame 3a; and a headrest 4 supported on the top of the seat back 3. The cushion frame 2a is fixed to a third pivot portion 14 and is supported on the joining unit 18 turnably about the third pivot portion 14. The frame 3a is turnably supported on the joining unit 18. A walk-in switch 3b is supported on the frame 3a.

At least a walk-in member 5, a disengagement member 7, a tip-up locking member 11, a stopper member 12, and a biasing unit 16 are supported on the joining unit 18.

The walk-in member 5 is supported on the joining unit 18 vertically turnably by means of a first pivot portion 6. The walk-in member 5 has an input portion 5a provided at an upper end portion, and an output portion 5b provided at a lower end portion. The input portion 5a and the output portion 5b are arranged with the first pivot portion 6 located between the input portion 5a and the output portion 5b. When the frame 3a is tilted toward the front side FR (walk-in operation) as the seat back 3 is tilted forward, the walk-in switch 3b of the frame 3a pushes the input portion 5a of the walk-in member 5 in the direction of an outlined arrow in FIG. 5. As a result, the walk-in member 5 is turned clockwise in FIG. 5 about the first pivot portion 6, so that the output portion 5b is turned in the direction of a black arrow in FIG. 5 about the first pivot portion 6.

The disengagement member 7 is supported on the joining unit 18 with the tip-up locking member 11 therebetween in such a way as to be vertically turnable by means of a second pivot portion 8 about the second pivot portion 8. The disengagement member 7 has one end portion 7a joined to the output portion 5b of the walk-in member 5 by a rod 9, and the other end portion 7b arranged at such a position as to be at a right angle to the one end portion 7a. A slide disengagement cable 10 is joined to the other end portion 7b of the disengagement member 7. A through-hole 7aa in which the rod 9 is locked is formed in the one end portion 7a of the disengagement member 7. A through-hole 7ba in which the slide disengagement cable 10 is locked is formed in the other end portion 7b of the disengagement member 7. A pressing portion lab is formed on the one end portion 7a of the disengagement member 7.

The tip-up locking member 11 has: one end portion 11a contacting the pressing portion 7ab of the disengagement member 7; another end portion 11b formed on the one end portion 11a in a bifurcated shape; and an engagement portion 11c extending from the one end portion 11a and the other end portion 11b toward the front side FR. The tip-up locking member 11 is supported on the joining unit 18 vertically turnably by means of the second pivot portion 8. A tension spring 17 is suspended between the other end portion 11b and a bracket 2ba obtained by cutting and raising a portion of the joining unit 18, and constantly rotationally biases the tip-up locking member 11 counterclockwise in FIG. 5 about the second pivot portion 8.

Figure 5:
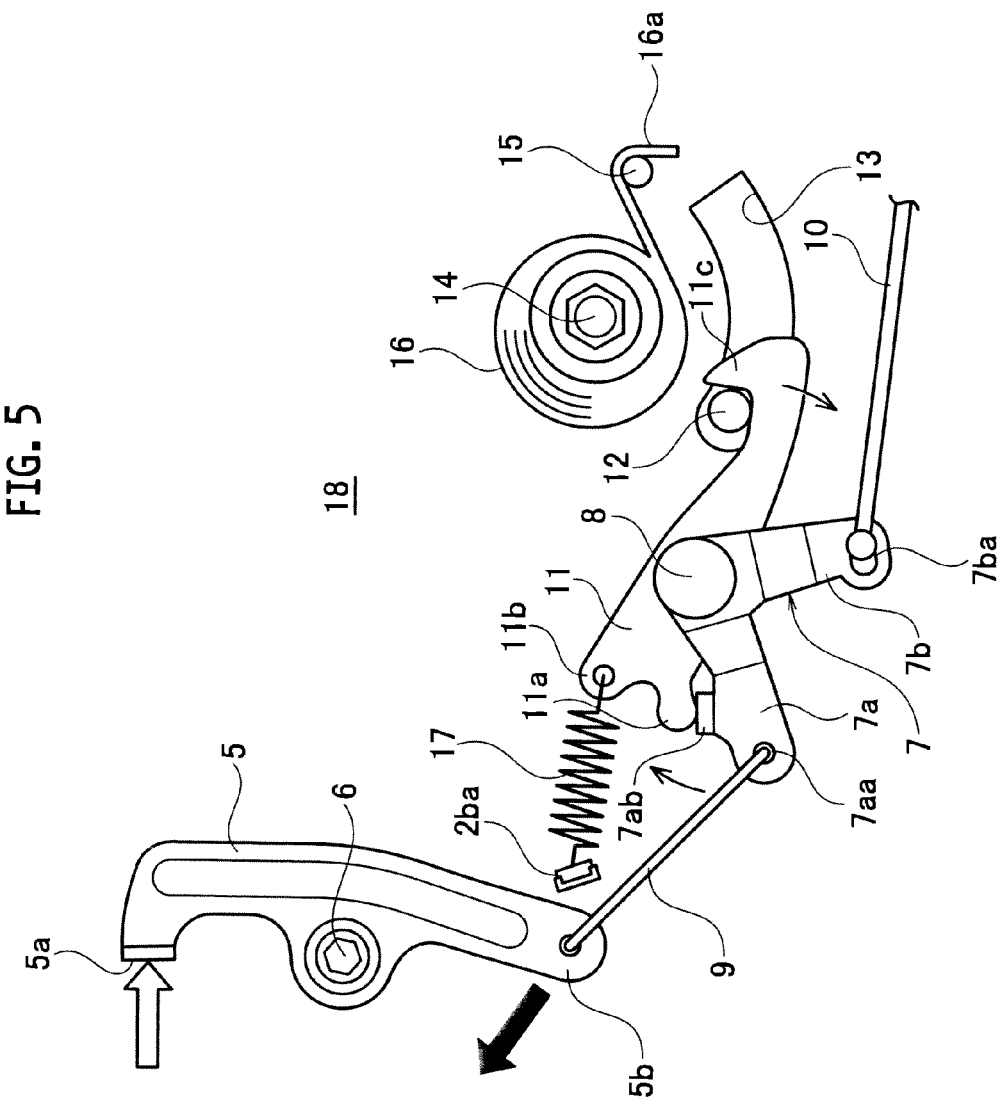
FIG. 5 is an enlarged side view of the main part of FIG. 2.

The stopper member 12 is joined to the cushion frame 2a. The stopper member 12 is movable inside a movement hole 13 which is provided in the joining unit 18 and long toward the front and rear sides, FR, RR. The stopper member 12 moves inside the movement hole 13 in response to the turn of the cushion frame 2a about the third pivot portion 14. The stopper member 12 can be engaged with and disengaged from the engagement portion 11c of the tip-up locking member 11. Specifically, the cushion frame 2a is held at a normal seatable position in a state where the stopper member 12 is engaged with and supported on the engagement portion 11c of the tip-up locking member 11 as illustrated in FIG. 5. On the other hand, the cushion frame 2a is tipped up, thereby making the vehicle seat 1 shorter in the front-rear direction, in a state where the stopper member 12 is disengaged from the engagement portion 11c and moved to a front end portion of the movement hole 13 as illustrated in FIG. 3.

The biasing unit 16 is a spiral spring wound around the third pivot portion 14 about which the cushion frame 2a is turned and tipped up. An end portion 16a of the biasing unit 16 is supported on a stopping pin 15 provided on the joining unit 18. With this configuration, biasing force that turns the third pivot portion 14 counterclockwise is applied.

As illustrated in FIG. 1, slide rails 20 being long rails on which the vehicle seat 1 can be moved toward the front and rear sides FR, RR are fixed to the floor of the vehicle. A lateral slide device 21 is attached to the vehicle seat 1, which is joined to the joining unit 18 and enables the vehicle seat 1 to be moved in the left-right direction of the vehicle.

Figure 2:
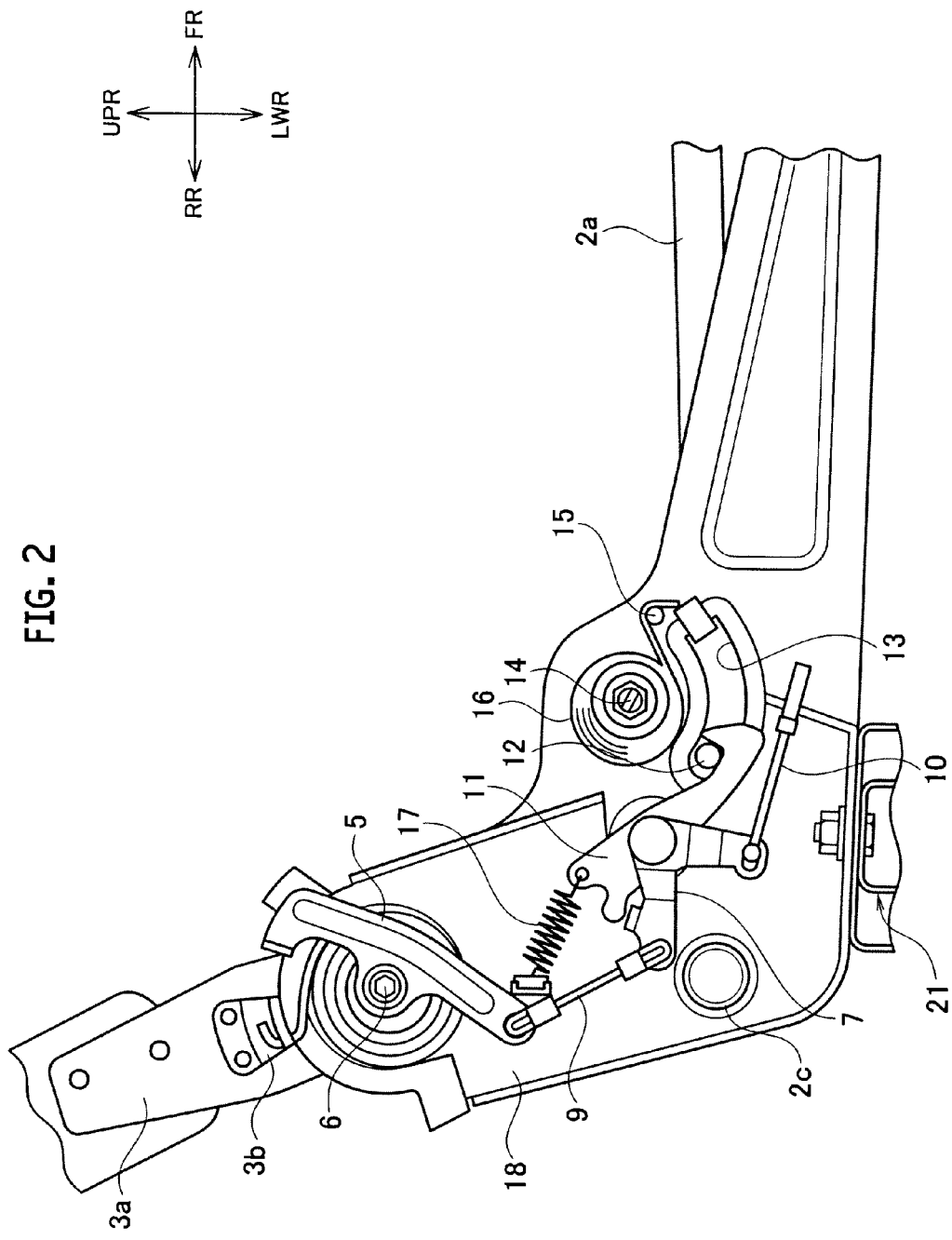
FIG. 2 is a side view of the vehicle seat in a normal state as seen in the direction of an arrow A in FIG. 1.
Figure 3:
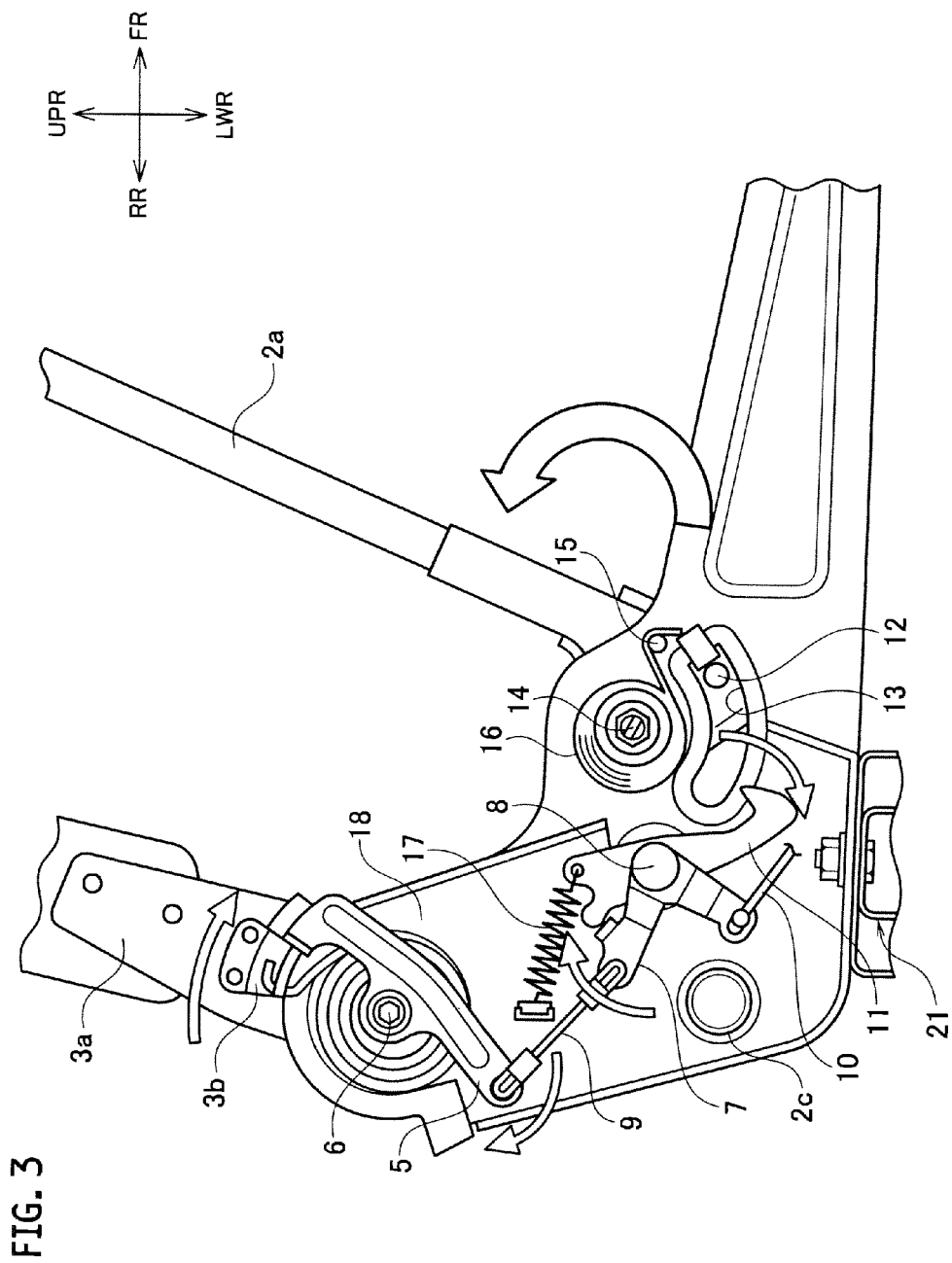
FIG. 3 is a side view of the vehicle seat as seen in the direction of the arrow A in FIG. 1, illustrating a state where a seat-cushion front end portion is tipped up.
Figure 4:
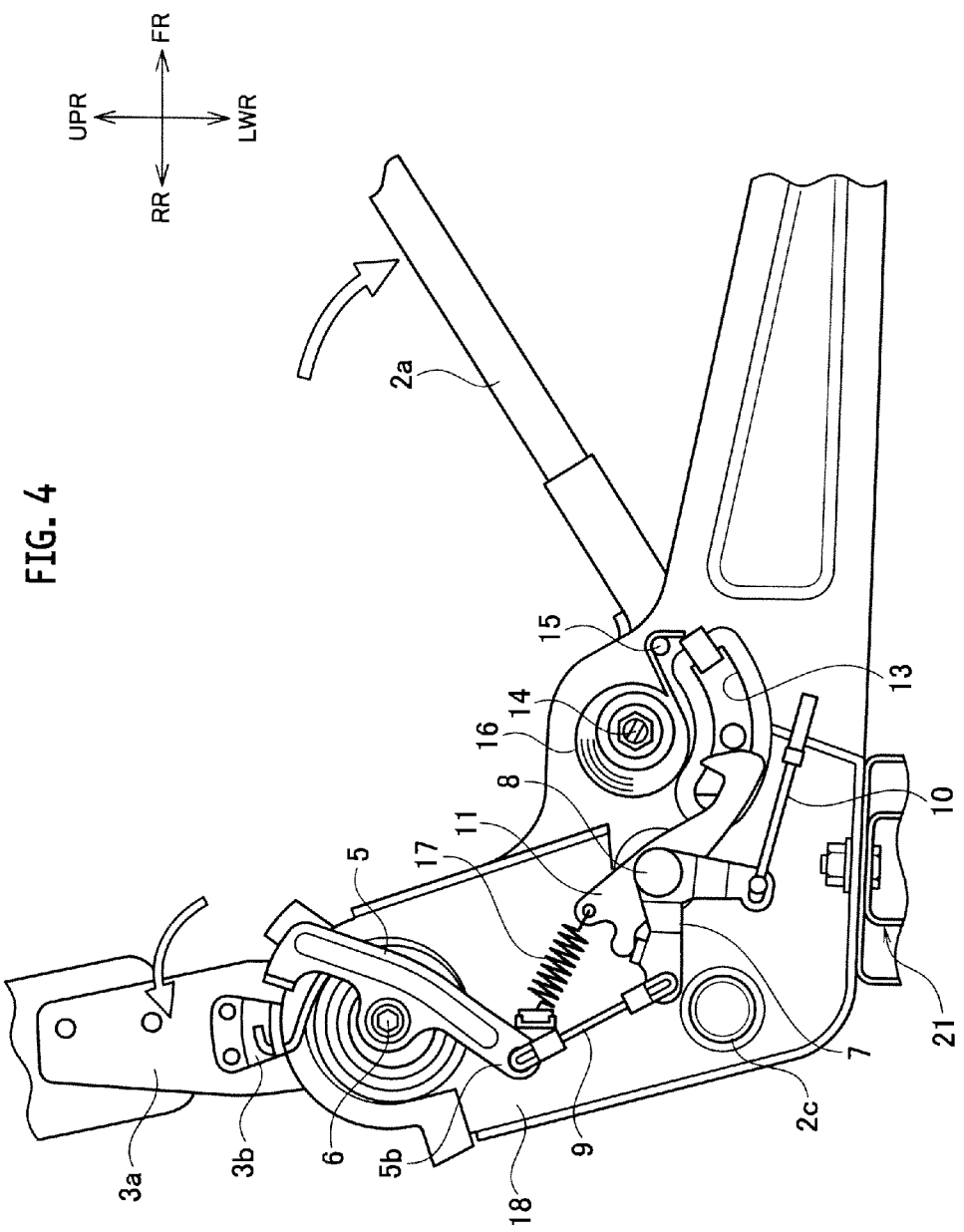
FIG. 4 is a side view of the vehicle seat as seen in the direction of the arrow A in FIG. 1, illustrating the seat-cushion front end portion which is being set back to the state of FIG. 2.

As the seat back 3 (frame 3a) at a seatable position illustrated in FIG. 2 is tilted forward, the walk-in switch 3b of the frame 3a pushes the input portion 5a of the walk-in member 5, thereby turning the walk-in member 5 clockwise (in the direction of an outlined arrow in an upper left area of FIG. 3) about the first pivot portion 6. With the turn of the walk-in member 5, the output portion 5b of the walk-in member 5 pulls the rod 9, thereby turning the disengagement member 7 about the second pivot portion 8. As a result, the one end portion 7a of the disengagement member 7 is moved clockwise, and the pressing portion lab presses the one end portion 11a of the tip-up locking member 11, so that the tip-up locking member 11 is turned clockwise about the second pivot portion 8. Accordingly, the tip-up locking member 11 and the stopper member 12 is disengaged from one other. At the same time, the other end portion 7b of the disengagement member 7 is moved clockwise, thereby pulling the slide disengagement cable 10, so that an unillustrated slide lock of the corresponding slide rail 20 is unlocked. Once the tip-up locking member 11 and the stopper member 12 are disengaged, the stopper member 12 is freely movable inside the movement hole 13. By the biasing force from the biasing unit 16, the seat cushion 2 (cushion frame 2a) is turned about the third pivot portion 14, so that the front end portion of the seat cushion 2 (cushion frame 2a) tips up. As described above, when the seat back 3 (frame 3a) is tilted forward, the slide lock is unlocked, allowing the seat cushion 2 to be moved forward, and also the seat cushion 2 (cushion frame 2a) automatically tips up.

According to the embodiment of the present invention, it is possible to provide a vehicle seat which includes a simple tip-up mechanism and is therefore low in manufacturing cost and light in weight.

Although the present invention has been described above by reference to the embodiments, the present invention is not limited to those, and various modifications can be made.

The invention claimed is:

1. A vehicle seat, comprising:
   a joining unit;
   a cushion frame joined to a seat cushion, turnably supported on the joining unit about a third pivot portion, and fixed to the third pivot portion;
   a frame joined to a seat back and turnably supported on the joining unit;
   a walk-in member turnably supported on the joining unit about a first pivot portion, and having an input portion and an output portion with the first pivot portion located between the input portion and the output portion;
   a disengagement member turnably supported on the joining unit about a second pivot portion, the disengagement member having one end portion joined to the output portion via a rod, another end portion arranged at a position being at a right angle to the one end portion, and a pressing portion formed on the one end portion;
   the rod joining the output portion of the walk-in member and the one end portion of the disengagement member; and
   a tip-up locking member turnably supported on the joining unit about the second pivot portion, the tip-up locking member having one end portion contacting the pressing portion, another end portion formed on the one end portion in a bifurcated shape, and an engagement portion extending from the one end portion and the other end portion toward a front side;
   a spring suspended between the other end portion of the tip-up locking member and the joining unit, and constantly rotationally biasing the tip-up locking member about the second pivot portion in a counterclockwise direction;
   a movement hole provided in the joining unit;
   a stopper member joined to the cushion frame and capable of engaging with and disengaging from the engagement portion of the tip-up locking member, the stopper member moving inside the movement hole in response to turn of the cushion frame about the third pivot portion; and
   a biasing unit applying a rotational biasing force to the third pivot portion in the counterclockwise direction,
   wherein a forward tilting of the frame causes a turning of the walk-in member, the turning of the walk-in member causes a turning of the disengagement member, the turning of the disengagement member causes a turning of the tip-up locking member thereby disengaged from the stopper member, and then the cushion frame is tipped up by the rotational biasing force applied by the biasing unit.

* * * * *